United States Patent [19]
Hopey

[11] Patent Number: 5,927,740
[45] Date of Patent: Jul. 27, 1999

[54] STEERING DAMPER IN AND FOR VEHICLES

[76] Inventor: Timothy C. Hopey, 4300 Rosanna Dr., Allison Park, Pa. 15101

[21] Appl. No.: 08/696,608

[22] Filed: Aug. 14, 1996

[51] Int. Cl.$^6$ .................................................. B62K 21/08
[52] U.S. Cl. .......................... 280/272; 280/280; 188/306
[58] Field of Search .................................... 280/270, 271, 280/272, 279, 280; 74/555.1, 551.2, 551.8; 188/306, 307, 308

[56] References Cited

U.S. PATENT DOCUMENTS

| | | | |
|---|---|---|---|
| 940,783 | 11/1909 | Buckland | 280/271 |
| 1,920,098 | 7/1933 | Moorhouse | 188/306 |
| 4,566,712 | 1/1986 | Montrenec | 280/272 |
| 4,773,514 | 9/1988 | Gustafsson | 280/272 X |
| 5,492,033 | 2/1996 | Hopey | 280/272 X |
| 5,516,133 | 5/1996 | Montrenec et al. | 280/272 |

*Primary Examiner*—Kevin Hurley
*Attorney, Agent, or Firm*—Hymen Diamond

[57] ABSTRACT

A steering damper particularly for a bicycle which is integrated into the bicycle. The damper includes a housing closed at the top by a cap from which sidewalls extend and at the bottom. The housing contains a damping medium. Within the housing thee is a dam connected to the housing and a single vane connected to a shaft which passes through the housing. There is an opening in the shaft which communicates with the vane to circulate the medium during the damping when the bicycle departs from the path in which it is being directed and during the suppression of the damping when the bicycle returns to the path along which it is directed. The effective cross-section of the opening in the shaft is of sufficient magnitude to permit unrestricted flow of the medium. The housing and dam are supported within the steer-tube by the clamp from the steer-stem and are connected to the clamp by a tapered bearing rotatably with the steer-tube as the steer-tube is rotatable by the handlebars. The vane and shaft are not rotatable. Rotation of the dam on departure of the bicycle from its directed path pressurizes the medium between the dam and vane by flow through the shaft producing the damping and return of the bicycle produces flow of the medium through the vane and shaft suppressing the damping.

33 Claims, 3 Drawing Sheets

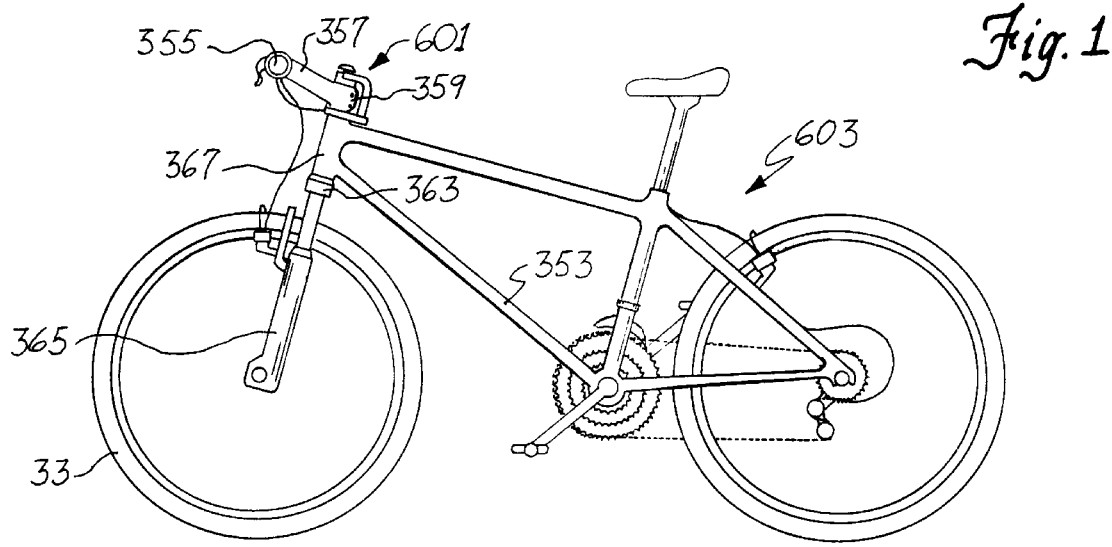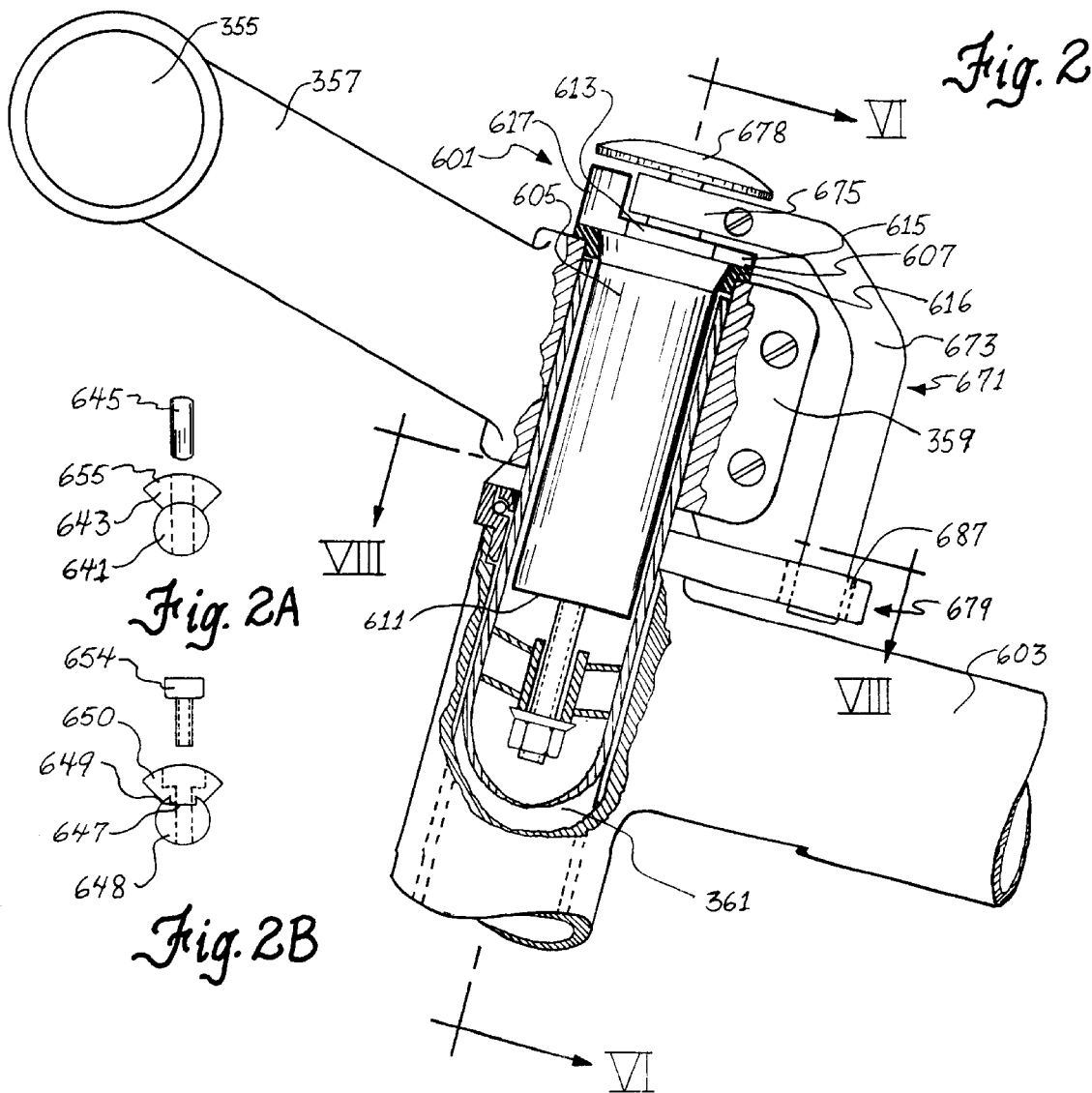

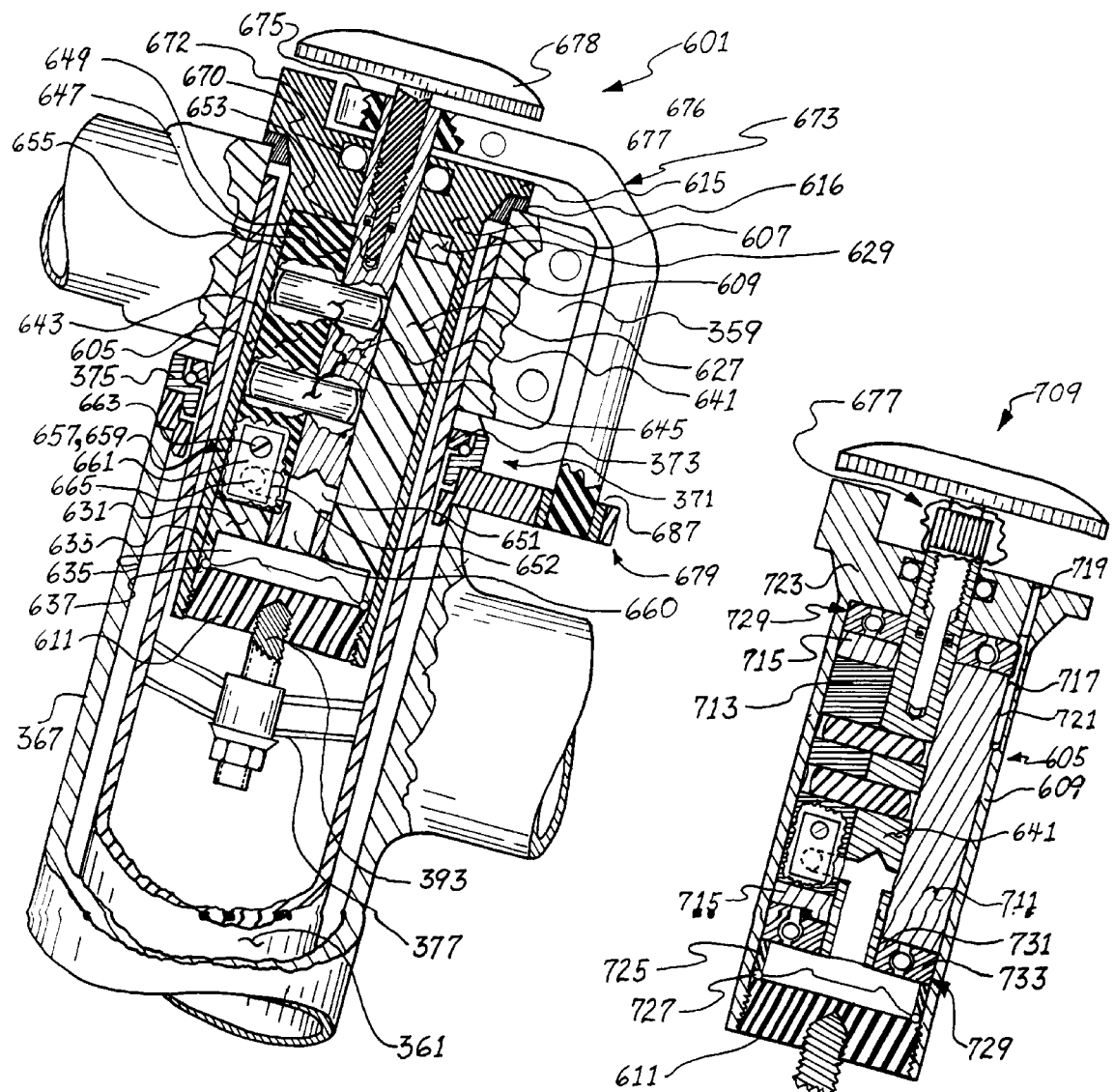

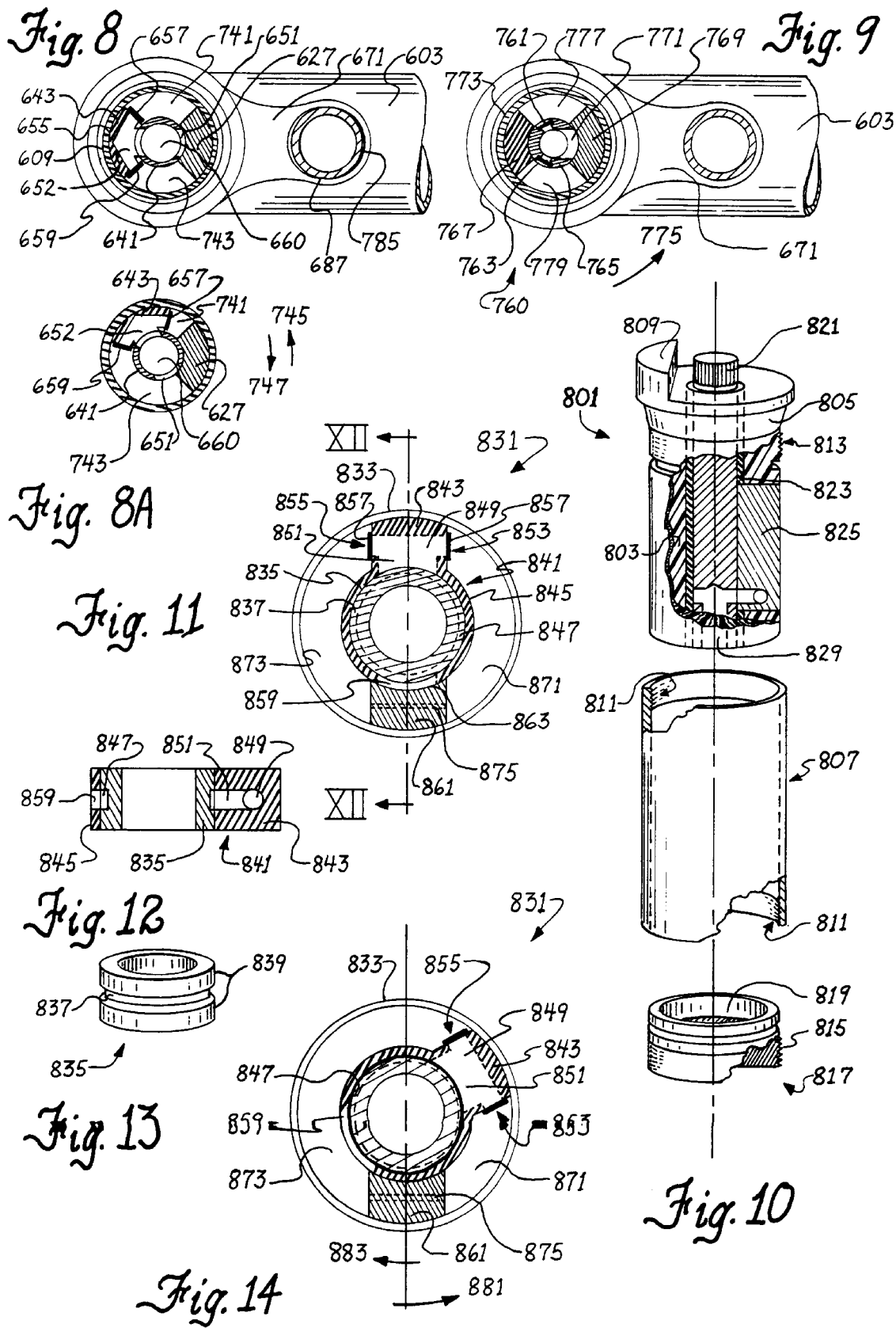

STEERING DAMPER IN AND FOR VEHICLES

REFERENCE TO RELATED APPLICATION

This application relates to application Ser. No. 08/392,516, filed Feb. 23, 1995 to Timothy C. Hopey for Steering Damper in and for Vehicles. Application '516 is incorporated in the instant application by reference.

FIELD OF INVENTION

This invention relates to vehicles and it has particular relationship to bicycles. It is to be understood that, to the extent that the principles of this invention are adapted to other vehicles than bicycles, for example, motorcycles, or even automobiles or trailer couplings, such adaptation is to be regarded as within the scope of equivalents of this invention.

DESCRIPTION OF THE PRIOR ART

Application Ser. No. 08/392,516 is typical of the prior art. Among the modifications which this invention discloses is a vehicle having integrated therein a steering damper which operates to damp the movement or rotation of the chain including the handlebars, steering stem, steer-tube, and steerable wheel when the handlebars are displaced from center and to suppress the damping when the handlebars return to center. The steering damper has a container or housing containing a damping fluid within which there are a dam and a plurality, usually two, of vanes. The housing is closed by a cap and a base. The dam is connected to, or integral with, the housing. A shaft passes axially through the housing. The vanes are connected to the shaft. The steering damper is mounted in the steer-tube with the housing and dam connected to the steer-stem rotatable with the steer-stem and steer-tube as the stem and tube are rotated by rotation of the handlebars.

The vanes and dam divide the housing into three compartments: a compartment of variable volume between the dam and one vane, a compartment of constant volume between the one vane and the other vane and a compartment of variable volume between the other vane and the dam. The vanes have one-way valves.

When the handlebars are displaced from center, the housing and base are moved so that the compartment between one vane and the dam is reduced in volume. The valve in the vane is in the closed setting and pressure is impressed on the fluid in the compartment and the fluid is conducted through a small opening in the dam or shaft which does not materially reduce the pressure and the displacement of the handlebars and the chain connected to it is damped. On the return of the handlebars to center, the fluid flows into the constant volume compartment between the vanes via recesses, typically in the cap and/or base of the housing to accommodate the flow of fluid. The pressure on the fluid is reduced and the damping is suppressed.

The apparatus disclosed in application '516 has performed highly satisfactorily. However, the two vanes and the recesses impose a substantial cost of manufacture and complicate the operation of the steering damper.

It is accordingly an object of this invention to overcome the above-described deficiencies of the prior art and to provide a steering damper adapted to be integrated in a vehicle which steering damper shall include only one vane and shall not require the recesses and shall avail effective control of the vehicle.

SUMMARY OF THE INVENTION

In accordance with this invention, there is provided a steering damper having a single vane. The vane and the dam define two compartments, one between the dam and the vane on one side and the other between the vane and the dam on the opposite side. The vane has one-way valves. Typically, each valve includes an opening in the vane which is covered by a resilient plate which normally holds it closed by the spring action of the plate. In operation, each valve is held closed by the pressure of the fluid in its corresponding compartment and opened by the pressure within the vane and relaxation of the pressure in corresponding compartment as the pressure of the fluid is affected by the position or rotation of the handlebars.

There is also a shaft connected to the vane. The shaft has a first generally transverse opening, considered a damping passage which connects the compartments. When the handlebars are displaced from center, the dam is moved relative to the vane reducing the volume of one compartment and exerting pressure on the fluid in this compartment, closing the valve in the vane which is in this compartment. The fluid flows through the opening, but the opening is of such low effective cross-sectional area that the displacement of the handlebars is damped. The damping rate can be set by adjusting the effective cross-sectional area of the opening in the shaft. It is within the scope of this invention that this opening in the shaft can be eliminated and the desired damping rate can be achieved by appropriately sizing the numerous fluid leak paths around the shaft, vane and the dam or through the dam.

The shaft has a second generally transverse opening which may be regarded as the free return passage. This opening is connected between the vane, one-way valves and a compartment when the handlebars are turned sufficiently with respect to the center position. When the handlebars are returned to center, the dam is retracted from the vane within which it has exerted pressure on the fluid in one compartment. Fluid from the second compartment whose volume is being reduced flows through the second opening, the vane opening and the valve which was closed and into the one compartment. Preferably, the effective cross-sectional area of this second opening is large enough so that the flow of fluid through this opening is substantially unrestricted and fluid pressure is substantiall unaffected and the damping is suppressed.

During the first phase of operation while the handlebars are displaced from center, the first valve in the vane is held closed by the fluid pressure as the dam approaches the vane in the first compartment and the fluid flows through the first opening in the shaft into the second compartment. The handlebars are damped as they move away from center. The fluid in the second compartment is supplemented from a reservoir in the steering damper. This purpose is served by an axial opening in the end of the shaft which is in communication with the second opening. Fluid circulates from the reservoir through the axial opening in the shaft's end which is connected to the shaft's transverse second opening. For return from the second transverse opening, there are two paths: one through the vane and the other directly through the end of the transverse opening remote from the vane valve. The second path offers lower resistance than the first path. The second compartment receives the needed fluid while it is expanded. In the absence of this feature, the second compartment would contain a partial vacuum causing the handlebars to spring back. By the connection of the reservoir through the bore in the end of the shaft with the second opening in the shaft, the shaft and the one-way valves in the vane are able to provide the two functions of feeding the expanding compartment with the needed fluid from the reservoir as the handlebars turn away from center and providing the suppression of damping the handlebars return to center.

During the second phase of operation when the handlebars are returned to center and the first compartment is expanded and the second compartment is contracted, the first valve is opened and fluid circulates freely from the second compartment where the fluid is under pressure by the retracting dam through the second opening in the shaft, the vane and the first valve and into the first compartment which expands, suppressing the damping. The damping is suppressed until the second opening in the shaft is closed as it passes the dam. The diameter of the second opening in the shaft can be smaller than the remaining width of the bore of the dam to aid in eliminating a potential suppression of damping when the handlebars are initially turned away from center. During the return of the handlebars to center, the second valve may be closed or open depending on the pressure differential across it. The one-way valves in the vane can be integrated into the shaft eliminating the need to adapt the vane for the valve's function.

The words "fluid" "medium" are used of the interchangably in this application. The use words and "damping fluid" and "damping medium" in this application and in its claims are intended to include within their scope media of any appropriate type including oils, gases, air and elastomers such as sponges and the like.

BRIEF DESCRIPTION OF THE DRAWINGS

For a better understanding of this invention, both as to its organization and to its method of operation, together with additional objects and advantages thereof, reference to made to the following description taken in connection with the accompanying drawings, in which:

FIG. 1 is a side view in elevation of an emobiment of this invention, showing a bicycle provided with a steering damper in accordance with this invention whose container or housing and dam are rotatable with the handlebars relative to the vane and shaft;

FIG. 2 is a fragmental view in side elevation and partly in section of a bicycle in accordance with this invention with the steering damper having a single vane;

FIG. 2A is a partially exploded fragmental view in transverse cross-section showing the relationship of the vane and the shaft of the steering damper shown in FIG. 2;

FIG. 2B is a partially exploded fragmental view in side elevation of a modification of the vane and shaft shown in FIG. 2A;

FIG. 3 is an exploded view in isometric of the race of one of the bearings on which the steer-tube of the bicycle is rotatable and with the lower clamp which forms a part of the clamping assembly for suppressing rotation of the vane connected to it;

FIGS. 4 and 5 each are a view in isometric of modifications of the bearing and clamp assembly shown in FIG. 3;

FIG. 6 is a fragmental view in longitudinal section taken along line VI—VI of FIG. 2 with parts broken away and with the bicycle frame partially sectioned showing the valve of the single vane and the dowel pins that hold the vane to the shaft;

FIG. 7 is a partial view in longitudinal section based on FIG. 6 but of a further modification of this invention for a bicycle including a steering damper whose FIG. 8 is a fragmental view in the transverse section taken along lines VIII—VIII of FIG. 2 showing the steering damper;

FIG. 8A is a partial fragmental view derived form the transverse section taken along line VIII—VIII of FIG. 2 as shown in FIG. 8 but with the housing and dam rotated correspondingly to rotation of the handlebars from center for a bicycle departing from its linear path, i.e., its directed path;

FIG. 9 is a fragmental view similar to FIG. 8 but showing a modification of this invention in which the valves are in the shaft;

FIG. 10 is an exploded fragmental view partly in longitudinal section showing another modification of this invention;

FIG. 11 is a view in transverse cross-section showing still another modification of this invention;

FIG. 12 is a view in longitudinal section taken along line XII—XII of FIG. 11;

FIG. 13 is a fragmental view in isometric showing a collar which constitutes a part of the embodiment shown in FIG. 11; and FIG. 14 is a view in transverse cross-section similar to FIG. 11 but corresponding to a setting in which the handlebars are returning to center from departure from center.

DETAILED DESCRIPTION OF EMBODIMENT

The apparatus shown in the drawings is a steer-tube/steer-stem type bicycle 603 including a frame 353 and handlebars 355 extending from a steer-stem 357. A clamp 359 extends integrally from the steer-stem 357 to clamp the steer-stem to a steer-tube 361 (FIG. 2). The steer-tube 361 is connected by clamp 363 to fork 365 which is connected to steerable wheel 33. The steer-tube 361 extends through a head 367 which is an integral part of the frame 353. The handlebars 355, steer-stem 357 and steer-tube 361 and the parts connected between the steerable wheel and the steer-tube 361 are rotatable on bearings 371 (FIG. 6) (only upper bearing shown) to steer the bicycle 603 through the steerable wheel. The moving race 373 of bearing 371 is secured to, or integral with, the steer-tube 361 and fixed race 375 is secured to, or integral with, the head 367.

The apparatus shown in FIGS. 1, 2 and 6 includes a steering damper 601 mounted in the steer-tube 361 of bicycle 603 (FIGS. 1 and 2). The steering damper 601 includes a housing 605 closed at the top by a cap 607 from which sidewalls 609 extend integrally (FIG. 6). The housing 605 has a threaded bottom closure 611 which is screwed into the sidewalls 609.

The cap 607 includes a hexagonal or otherwise flat-sided surface 613 (FIG. 2) on a radially extending projection 615 (FIG. 6). The steering damper 601 is supported on the clamp 359. A tapered-lipped bushing 616 is interposed between the projection 615 of the cap 607 and the clamp. The projection 615 and the bushing 616 constitute a soft bearing for the damper 601. The cap 607 includes an axially projection 617 extending from its periphery above radial projection 615. The interior of the housing 605 is defined between the cap 607, sidewalls 609 and closure 611.

The steering damper 601 (FIG. 6) includes a dam 627. The dam 627 is generally in the shape of a segment of a hollow cylinder extending substantially over its maximum angle consistent with structural and manufacturing demands, typically 80°. It is mounted in the steering damper 601 coaxially and in sliding engagement with the sidewalls 609 and its upper base in engagement with the inner surface of the cap 607. The dam 627 is secured to the housing rotatably therewith by dowel pins 629 between the abutting surfaces of the cap 607 and the dam 627 (FIG. 6). A generally circular annulus 631 extends from the bottom of the dam and a cylindrical skirt 633 extends from the annulus. The skirt 633 and the annulus 631 define a reservoir 635. A diaphragm 637 is secured between the bottom of the skirt 633 and the upper surface of the base 611 of the container. The diaphragm 637 serves to absorb pressure differentials of the fluid with which the damper 601 is filled during temperature and operating cycles.

The tapered bearing 616 is rotatable with the clamp 359 and thus with the steer-tube 357 as the steer-tube is rotated by the handlebars 355. The tapered bearing serves as a connection between the clamp 359 and the cap 607 and through the cap with the sidewalls 609 and the dam 627. Through this connection, the cap 607, the side-walls 609 and the dam 627 are rotated in synchronism with the handlebars. The tapered bushing may also be fitted between the inner surface of the steer-tube 361 and the steering damper to rotate the dam in synchronism with the handlebars.

The steering damper 601 also includes a shaft 641 (FIGS. 6, 7) coaxial with the housing 605, and also a vane 643. The shaft 641 and the vane 643 are secured together by dowel pins 645. The shaft 641 is generally cylindrical but may have a flattened outer surface 647 in the form of a keyway (FIG. 2B) as in shaft 648 of the modification shown, which engages a corresponding flattened inner surface 649 in the form of a key of the vane 650. There are cooperative openings in shaft 641 and vane 643 as shown in FIG. 2A for engagement by the dowel pins 645 or threaded openings in shaft 648 of the modifications shown in FIG. 2B and vane 650 for engagement of a screw 654. The shaft 641 also has transverse openings 651 and 653. The opening 651 is in communication with a transverse opening 652 in the vane 643 (FIG. 8). The opening 653 serves to conduct fluid when the fluid in the steering damper is under pressure. The opening 651 is of greater effective cross-section than the opening 653 more readily transmitting medium. The effective cross-sectional area of opening 651 should be such that flow of medium through this opening in the operation of the steering damper is substantially unrestricted.

The vane 643 is generally a sector of a cylinder whose outer surface 655 has a radius of curvature substantially close to that of the inner surface of the sidewalls 609 and is mounted in the housing 605 with the sidewalls 609 slidable relative to the vane (FIGS. 8, 8A). The vane 643 has valves 657 and 659 on its circumferential ends. Each valve includes a resilient plate 661 which may be regarded as a gate, secured at one end to the circumferential surface by a screw 663 (FIG. 6). Each plate 661 covers an opening 665 in the vane which is in communication with the opening 651 (FIG. 8). The plate 661 by its spring action normally closes the valve. When pressure is impressed on the medium in a compartment, plate 661 holds valve 657 or 659 closed, blocking flow of fluid through openings 665 (FIG. 8), 652 and 651 in the vane 643 and shaft 641. The pressure of the medium inside the vane 643 is in a direction to open the other valve 659 or 657 but may not be sufficient to overcome the resilient force of plate 661. It is to be understood that, instead of normally closed valves 657 and 659, normally open one-way valves may be used in the practice of this invention. With normally open valves, the valve in the compartment in which the pressure is impressed is closed by the pressure while the other valve remains open. At its end abutting reservoir 635, shaft 641 has an axial opening 660 in communication with the transverse opening 651 in the shaft 641 (FIG. 6).

The shaft 641 is mounted substantially coaxially with the sidewalls 609 and with the vane 643 extending circumferentially. A seal 670 is interposed between the outer surface of the shaft 641 and the cap 607 extending into a circular slot 672 in the head. The area of the passage for the fluid through opening 653 in the shaft 641 can be set by a screw 676 with a knurled head 678 which meshes with a thread in the shaft 641. The magnitude of the damping pressure is thus controlled. The control may be affected as disclosed with reference to FIGS. 2A and 2B of application Ser. No. 08/592,516 by a ball (442) carried by a cantilever (444) connected to screw 677.

At its end at reservoir 635, shaft 641 has an axial opening 660 which is in communication with transverse opening 651. During displacement of the handlebars when pressure is applied to the medium in one of the compartments, the medium in the other compartment is supplemented by flow from the reservoir 635 through the axial opening 660 in the shaft 641. At the junction with the transverse opening 641, the medium can flow through two parallel paths into the other compartment which is expanding: one path through the corresponding valve 657 or 659 and the other through the end of the transverse opening 651 remote from this valve. The latter path offers the lower resistance.

The steering damper 601 replaces the bolt and cap which applies pressure to the bearings 371 in prior-art bicycles. (See FIG. 2 and accompanying description in application '516). The steering damper 601 is connected by stud 393 secured to the star nut 377, which is suspended from the steer-tube 361. The star nut 377 and the stud 393 not only add to the support of the steering damper but, also, apply pressure to the bearings 371 and the soft bushing 616 provided by the projection 615 effectuating the synchronous rotation of the housing 605 and dam 627 with the handlebars 355.

A clamp assembly 671 secures the unit including shaft 641 and vane 643 from rotating with the unit including housing 605 and dam 627. This clamp assembly has an arm 673 having a yoke 675 including internal splines at the upper end. The yoke 675 engages the shaft 641 near the top; the shaft has splines 677 (FIG. 7) which match the splines in the yoke. The clamp assembly also includes a bracket 679 having a yoke 681 from which a projection 683 extends (FIG. 3, 6). The yoke 681 encircles and is secured to the lower fixed race 375 of the bearing 371 on which the steer-tube 361 is rotatable. The arm 673, near its lower end, engages in an opening 685 on projection 683 through a bushing 687. Additionally, hole 785 of lower clamp 671 may be elongated in direction shown (FIG. 8) to substantially decrease the radial load on shaft 641 during operation when shaft 641 is not exactly concentric with bicycle's steering axis of rotation The inner surface of the dam 627 in contour matches, i.e., is substantially close to the radius, or curvature of, the shaft 641 (FIG. 8). This inner surface of the dam 627 extends over a greater angle than the openings 651 in the shaft 641 as shown in FIG. 8. This feature prevents unstable operation when the bicycle is moving linearly by overlap of the dam 627 by the opening 651 which would result in undesirable suppression of the damping on the initial rotation of the handlebars. Since the lower bearing 375 is ultimately secured to the frame 353, the shaft 641 and vane 643 are prevented from rotating with the housing 605 and dam 627. The arm 673 of the clamp assembly 671 serves as a stop for projection 617 preventing impact of the vane 643 with the dam 627.

FIGS. 4 and 5 show a modifications of the lower part of the clamp assembly. In the modification of 691 of FIG. 4, the bearing 693 and the bracket 695 are shown as an integrated assembly. In the modification 697 shown in FIG. 5, the bracket 698 is of relatively small thickness and in use is secured to the lower race 703 of the bearing 705.

The embodiment 709 of the invention shown in FIG. 7 is, to a large extent, similar to the modification disclosed in FIG. 6. Only the difference between the two modifications will be described.

The dam 711 of the embodiment shown in FIG. 7 has arms 715 extending inwardly. The vane 713 is nested between the arms 715 being in the cylindrical section bounded by the arms 715, the sidewalls 609 of the housing 605 and the shaft 641. The dam 711 is secured to the housing 605 by a key 717 extending through coextensive keyways 719 and 721 in the cap 723, dam 711 and sidewalls 609. The cap 723 is otherwise similar to the cap 607 of the embodiment shown in FIG. 6. A hollow cylindrical member 725 is supported on the bottom closure 611. A diaphragm 727 is secured between the end of the cylindrical member 725 and the closure extending into the reservoir 635 defined by the cylindrical member and the closure 611. As in the embodiment shown in FIG. 6, the reservoir 635 is connected to the opening 651 in shaft 641 through the axial opening 660 in the shaft. There are ball bearings 729 between the housing 605 and the shaft 641. The one race 731 is connected to the shaft and the other race 733 is connected through the dam 711 to the sidewalls 609 of the housing 605 which rotates relative to the shaft. The races 733 of the bearings 729 are structured so that the bearings exert radial pressure. Thus the bearings 729 applied radial support to the shaft which makes the unit operate smoother. If there is a side load on the shaft and no bearing, the surface of the dam rubs on the shaft. This has been a problem for years in rotary dampers. The dam may be made completely from an appropriate bushing material such as "Delrin, TM" eliminating bearings 729.

The operation of the embodiments shown in FIGS. 2, 6 and 7 will now be described with reference to FIGS. 8 and 8A. The shaft 641 at its outer surface, the vane 643 and the dam 627 define compartments 741 and 743. FIG. 8 shows the relative position of vane 643 and dam 627, i.e., directly opposed from one another when the bicycle 603 is steered along a straight line. This is an arbitrary position.

The dam 627 extends over and overlaps the opening 651 in the shaft 641. The vane 643 extends over the opening 651, 180° from the dam in the FIG. 8 setting. The vane is in communication with the opening, but flow of fluid is blocked by the dam.

Now, with reference to FIG. 8A. Assume that the handlebars have turned so that the dam 627 is turned counterclockwise in the direction of arrow 745 exerting pressure on the fluid in compartment 741. Valve 657 is held closed and fluid under pressure is forced through opening 653 (FIG. 6) in shaft 641 into compartment 743. Valve 659 is opened and fluid circulates from reservoir 635 (FIG. 6) through openings 660 and 651 in shaft 641 and valve 659 to aid in the flow into expanding compartment 743. The opening 653 in shaft 641 is of small diameter or cross-sectional area, typically 0.080-inch. Ultimately, this diameter does not restrict flow until reduced by screw 676 (FIG. 6). Restricting the flow from compartment 741 into compartment 743 damps the displacement of the handlebars. The conduction of fluid from compartment 741 into compartment 743 may be effected in other ways than by conduction through an opening in the shaft 641. For example, there may be a channel through dam 627 or elsewhere.

Now, assume that the handlebars are returning from displacement. Dam 627 moves in the direction of arrow 747.

The fluid in compartment 743 is under pressure and valve 659 is held closed and valve 657 is opened and fluid circulates from reservoir 635 through openings 651 and 660 in shaft 641 and valve 657 to aid in the flow into expanding compartment 741. Fluid circulates from compartment 743 through openings 651 in the shaft 641 through valve 657 into compartment 741. Opening 651 is of substantially larger diameter, or effective cross-section area, than opening 653, typically 0.140-inch and does not restrict the flow of the fluid or medium. Essentially, the pressures in compartments 741 and 743 are equalized. The fluid is not compressed and the handlebars on the returned rotation are not damped.

Within the scope of this invention, the difference in the pressure impressed through the openings 653 and 651 in shaft 641 may also be achieved by openings in shaft 641 of the same cross-section, but with the opening corresponding to opening 653 in cross-section restricted by screw 676. The circulation through the opening 651 in shaft 641 prevents the buildup of pressure in the decreasing compartment during the return movement of the handlebars, which would damp the return movement of the handlebars.

FIG. 9 shows another embodiment 760 of this invention. In this case, one-way valves 761 and 763 are in the shaft 765. The advantage of this embodiment is that the vane 767 requires no passages. FIG. 9 shows the steering damper as it is set when the bicycle is moving linearly. This is an arbitrary position. The dam 769 extends over and overlaps the opening 771 in the shaft. With the handlebars displaced from center in one direction, the housing 773 and dam 769 are rotated counterclockwise in the direction of the arrow 775. When the vehicle departs from linear motion, valve 761 is closed and the fluid in compartment 777 is pressurized producing damping. The fluid flow into compartment 779 is through a hole (not shown) in shaft 765 and through valve 763 in shaft 765. On the return of the handlebars, valve 761 is opened and the fluid is circulated through opening 771 and the damping is suppressed. An anlogous operation takes place if the handlebars are displaced to produce clockwise movement of the dam 769.

FIG. 10 shows a steering damper 801 including a dam 803 and head 805 as an integrated structure. The advantage of this modification is that the housing is a cylinder 807 instead of the combined structure in which the housing 605 and cap 607 (FIG. 6) are integral. The head 805 has a projection 809 which is adapted to limit the rotation of the unit including the dam 803 and housing 805 by engagement with a clamp such as clamp 671 of FIG. 6.

The housing 807 has internal thread shown in FIGS. 11 through 14 for engaging thread 813 and 815 on head 805 and skirt 817. The skirt defines a reservoir 819 which is in communication with an opening in shaft 821 through an axial opening 829 in the inner end of shaft 821 as in FIG. 6. The shaft 821 engages sleeve bearings 823 in the head 805 and dam 803. The vane 825 is seated between the head and the projection extending from the dam and is secured to the shaft 821.

The steering damper 831 is of the doughnut type generally analogous to the dampers disclosed in applicant's U.S. Pat. No. 5,492,033. The damper is adapted to be mounted coaxially with the steer-tube (not shown) of the bicycle and to be rotated with the steer-tube as the steer-tube is rotated by the handlebars (not shown) or undesirably by the steering wheel (not shown).

The damper 831 includes an outer closed housing 833 containing a damping medium and fixed to the outer race of the steering head bearing (371, FIG. 6). Within the housing 833 there is an annular collar 835 having a groove 837 between what may be regarded as flanges 839 (FIG. 13). There is also a vane assembly 841 including a vane 843 extending integrally from an annulus 845. The annulus 845 is coaxial with the collar 835 with its inner periphery abutting the peripheral rim of the flange 839 forming with the groove 837 a passage 847 for the damping medium. The passage 847 is in communication with an opening 849 in the vane 843 through channel 851. The opening 849 in the vane terminates in one-way valves 853 and 855. The valves 853 and 855 have on their external surfaces 857 resilient plates which are normally held closed by their resilience, but are opened by pressure of the medium counteracting the resilience. Generally, diametrically opposite the vane 843, the annulus 845 has an opening 859 in medium flow communication with the annular groove or passage 847. The effective cross-section of the groove is such that the flow of the medium which enters through opening 859 is substantially unrestricted.

The damper 831 also has a dam 861 generally in the form of a segment of a circular cylinder whose internal surface 863 has substantially the same curvature as the external surface of the annulus 845. The dam 861 may have the same curvature as the internal surface of the housing. The unit including the vane assembly 841 and collar 835 forming the groove 847 and the unit including the housing 833 and dam 861 are rotatable one relative to the other.

Between the vane 843 and the dam 861, compartments 871 and 873 are defined. The dam has an opening 875 through which the compartments 871 and 873 are in medium communication.

When integrated with a bicycle, the steering damper 831 is mounted with the units 833–861 and 835–857 substantially coaxial with the steer-tube of the bicycle, with one unit connected to the frame and the other connected rotatable with the steer tube. The unit connected to the steer-tube is rotatable with the steer-tube and thus synchronously with the handlebars. Specifically, the housing unit 833–861 may be connected to the frame and the vane unit 835–847 rotatable with the steer-tube. With the bicycle moving linearly, the damper is in the state shown in FIG. 11 with the dam 861 overlapping the opening 859 and not allowing interchange of medium between compartments 871 and 873 via passages in vane assembly 841. It is assumed that the unit 835–857 is connected to the steer-tube and that the handlebars are rotated clockwise in the direction of the arrow 883. The medium in compartment 871 is subjected to pressure, valve 853 is closed damping the rotation of the handlebars. The medium is forced by the pressure to flow through opening 875 in the dam 861, but the opening is of small effective cross-sectional area and the pressure in compartment 871 and the damping is maintained.

Now assume that the handlebars are returned to center. The pressure in compartment 871 is reduced and valve 853 is opened. The medium now flows from compartment 873 through opening 859, passage 847, passages 851 and 849, valve 853 into compartment 871 which is expanding. The effective cross-sectional area through opening 853 groove 847, channel 851 and opening 849 is such that the flow of medium is substantially unrestricted and the damping is suppressed.

It is to be understood that within the scope of this invention, the steer-tube 361 may serve as housing for the steering damper as disclosed in FIG. 29, application '516. But the resulting damper would, aside from the housing, have the structure disclosed in FIGS. 6 or 7 including one vane cooperative with a shaft structure internally to circulate fluid and may have an external clamp for suppressing rotation of the vane and shaft. Also, components of FIG. 11 may be integral with steer-tube and head of bicycle as disclosed in U.S. Pat. No. 5,492,033.

While preferred embodiments of this invention are disclosed herein, it is understood that many modifications thereof are feasible. This invention is not to be restricted except insofar as is necessitated by the spirit of the prior art.

I claim:

1. A steering damper for a vehicle having a frame, steerable wheel means mounted on said frame movable in opposite directions from center to steer said vehicle, handlebars mounted on said frame rotatable from center relative to said frame in opposite directions about an axis, and connected to said steerable wheel means for controlling the steering movement of said steerable wheel means, said handlebars being mounted on said frame so that said steerable wheel means is in center with said handlebars in center and rotation of said handlebars in either direction produces the movement of said steerable wheel means in direction corresponding to the direction of rotation of said handlebars, said handlebars being manually rotatable from said center in either direction and also being rotatable from center undesirably as on contact of said steerable wheel means with an obstruction: said steering damper including a housing adapted to contain a damping medium therein and having a generally axial shaft and also having a vane connected to said shaft forming with said shaft a unit defined herein as a vane-shaft unit, said steering damper also including a dam connected to said housing and forming with said housing a unit defined herein as a dam-housing unit, said vane-shaft unit and said dam-housing unit defining separate compartments either of which are designated in the interest of convenience, a first compartment and the other as a second compartment in said housing, connection adapted to be interposed cooperatively between said steering damper and said handlebars for moving said dam-housing unit and said vane-shaft unit, one relative to the other, on rotation from center of said handlebars, thereby to contract the available volume of, and exert pressure on, the medium in said first compartment and expand the available volume of the medium in said second compartment, thereby to damp the movement of said handlebars, and also for moving said dam-housing unit and said vane-shaft unit, one relative to the other, on return rotation of said handlebars to center thereby to expand the volume and reduce the compression of said medium in the said first compartment and reduce the volume of the medium in said second compartment, suppressing the damping for the return rotation of said handlebars; the said steering damper being characterized by that said vane and said shaft include cooperative means for accommodating the flow of said medium during the damping and the suppression of the damping.

2. The steering damper of claim 1 characterized by that the accommodating means includes communicating openings in the vane and in the shaft adapted, when pressure is exerted on the medium in the first compartment, to be connected in a fluid circuit including the second of the first and second compartments to circulate fluid through the second compartment and when the pressure in said first compartment is reduced to circulate medium through said first compartment thereby to accommodate the flow of said medium during the damping and the suppression of the damping.

3. The steering damper of claim 2 characterized by that the vane includes a first valve which is adapted to be closed during the displacement from center of the handlebars, the closing of the first valve maintaining the pressure of the fluid in the first compartment and the damping of the displacement from center of the handlebars; and the first valve being open on the relaxation of the pressure of the medium during the return of the handlebars from displacement circulating the medium from the second compartment, through the vane and the opening in the shaft into the first compartment whereby the damping is suppressed during the return of the handlebars from displacement.

4. The steering damper of claim 2 characterized by that the shaft includes a first valve which is adapted to be closed during the displacement from center of the handlebars, the closing of the first valve maintaining the pressure of the medium in the first compartment and the damping of the displacement from center of the handlebars, and the first valve being open on the relaxation of the pressure of the medium during the return of the handlebars from displacement circulating the medium from the second compartment through the first valve and the opening in the shaft into the first compartment whereby the damping is suppressed during the return of the handlebars from displacement.

5. The steering damper of claim 2 characterized by that the vane has valve means positioned in the vane so that in dependence upon the directions of displacement from center and return to center of the handlebars, one valve is adapted to be opened or closed and the other valve is adapted to be closed or opened thereby, in cooperation with the openings in the vane and shaft, to control the flow of medium during the displacement of the handlebars from center.

6. The steering damper of claim 1 characterized by that the cooperative means includes a vane which has a passage for medium therethrough and first and second valves for controlling the flow of medium through said passage and further characterized by that said shaft has an opening therethrough in communication with said passage, said first valve being interposed between said passage in said vane and the first compartment and said second valve being interposed between said passage in said valve and said second compartment, said first valve being closed on the displacement of the handlebars from center maintaining the pressure of the fluid in the one compartment and effectuating the damping against the displacement from center of said handlebars, and said first valve being open on the return of the handlebars to center thereby to circulate the medium through said passage in said vane, said first compartment and the opening in said shaft effectuating the suppression of the damping during the return of the handlebars to center.

7. The steering damper of claim 6 characterized by a passage directly interposed between the first compartment and the second compartment conducting medium from the first compartment to the second compartment on the displacement of the handlebars from center, said passage having an effective transmitting area which is small compared both the effective transmitting area of the opening in the first valve when said first valve is open, the effective area of said passage being so small that the departure of the handlebars from center notwithstanding its transmission of medium from the first compartment to the second compartment.

8. The steering damper of claim 7 characterized by means for setting the effective transmitting area of the passage between the first compartment and the second compartment.

9. The steering damper of claim 7 characterized by that the effective transmitting area of the passage between the first and the second compartments is small compared to the effective transmitting area of the opening in the shaft through which the medium is circulated.

10. The steering damper of claim 1 characterized by cooperative means including a shaft having a first opening therein for conducting medium under pressure from the first compartment to the second compartment on rotation of the handlebars from center and also having a second opening for conducting medium from said second compartment to said first compartment on the return of said handlebars to center, said second opening being of substantially greater effective cross-sectional area than said first opening whereby the flow of medium through said first opening is restricted as rotation of the handlebars from center is damped and the flow of the medium through the second opening, is substantially less restricted and return of the handlebars to center is substantially undamped.

11. A vehicle including a frame, handlebars connected rotatably to said frame, a steer-tube connected to said frame and to said handlebars rotatably with said handlebars and a steering damper including a housing having a dam connected thereto and vane means, said vane means and dam being adapted to be immersed in a damping medium in said container, means connecting said steering damper and said steer-tube for rotating said housing and said dam and said vane means, one relative to the other, with said steer-tube as said steer-tube is rotated with said handlebars to damp the rotation of the handlebars as the handlebars are displaced from center and to suppress the damping as the handlebars are returned to center; the said vehicle being characterized by means connected to said steering damper for limiting the angle of rotation of said handlebars and steer-tube to preclude damage to said steering damper by impact of said dam and said vane means.

12. The vehicle of claim 11 characterized by that the limiting means is a projection extending from the housing.

13. The steering damper of claim 11 characterized by that the limiting means is a projection extending from the dam.

14. A vehicle having a frame, steerable wheel means mounted on said frame movable in opposite directions from center to steer said vehicle, a steer-tube mounted rotatably on said frame, handlebars mounted on said frame rotatable from center relative to said frame in opposite directions about an axis and connected to said steerable wheel means through said steer-tube for controlling the steering movement of said steerable wheel means, said handlebars, said steer-tube and said steerable wheel means being mounted on said frame so that said steerable wheel means is in center with said handlebars in center and rotation of said handlebars in either direction actuates said steerable wheel means to move in direction correspondingly to the rotation of said handlebars, said handlebars being manually rotatable from center in either direction and also being rotatable from center undesirably as on contact of said steerable wheel means with an obstruction; said vehicle also including a steering damper mounted in said steer-tube and connected thereto, said steering damper having a housing adapted to contain a damping medium and also having within said housing a dam, a vane and a shaft, connected to said vane, said vane having a channel therein for conducting said medium and said shaft having an opening therein in medium communication with said channel, said vane and dam dividing said housing into a first compartment defined between said vane and one surface of said dam and a second compartment defined between said vane and the opposite surface of said dam, said shaft being positioned relative to said dam with its opening closed by said dam with the handlebars substantially at center, displacement of the handlebars from center in either direction actuating the unit including the housing and dam and the unit including the vane and shaft to move in one direction, one relative to the other, through the connection to the steer-tube causing pressure to be exerted on the medium in a corresponding one of said compartments thereby damping said displacement of the handlebars and during return of the handlebars to center actuating said units to move, one relative to the other, in the opposite direction to reduce said pressure of said medium in said one of said compartments thereby to suppress said damping; said vehicle being characterized by that the inner surface of the dam and the outer surface bounding said opening in said shaft are matching surfaces and by that with the handlebars substantially at center, the surface of the dam overlies the surface bounding the opening in the shaft and extends at each end beyond the boundary of the opening in said shaft whereby as said handlebars return to center, the medium is not pressurized introducing damping for the rotation of the handlebars as the handlebars approach center.

15. A vehicle including a frame, handlebars connected rotatably to said frame, a steer-tube connected to said frame and to said handlebars rotatably with said handlebars; and a steering damper including a housing and a dam and a shaft and a vane connected thereto, said vane and dam being adapted to be immersed in a damping medium in said housing; said steering damper being mounted within said steer-tube, connections between said steering damper and said steer-tube for rotating said dam and vane, one relative to the other as said steer-tube is rotated with said handlebars, cooperatively with said medium to damp the movement of said handlebars as said handlebars are displaced from center and to suppress the damping of said handlebars as said handlebars are returned center, the said vehicle being characterized by a channel in said shaft for circulating said medium to effect the suppression of the damping.

16. The vehicle of claim 15 characterized by that the connection between the steer-tube and steering damper for rotating the steering damper with the steer-tube includes tapered bushings interposed between said steering damper and said steer-tube.

17. The vehicle of claim 15 characterized by that the steer-tube serves as the housing.

18. A steering damper for a vehicle adapted to be connected to said vehicle to damp the steering, said damper including a first unit having a housing adapted to contain a damping medium and a dam within and connected to said housing, a second unit having a vane within said housing and a shaft extending through said housing connected to said vane, said vane and dam of said units defining between them separate compartments, either compartment being herein designated in the interest of convenience a first compartment and the other a second compartment, said first unit and second unit being movable, one relative to the other, to increase or decrease the volume of the medium in said first compartment and correspondingly to decrease or increase the volume of the medium in said second compartment, first medium communicating means interposed between said first compartment and said second compartment for conducting medium from said first compartment to said second compartment, and a channel in said shaft connected to said vane for conducting medium from said second compartment to said first compartment, the effective cross-sectional area for conduction of said medium through said channel being effectively substantially greater than the effective cross-sectional area for conducting said medium through said medium communicating means.

19. A steering damper for a vehicle, said vehicle having a frame, steerable wheel means mounted movable on said frame in opposite directions from center to steer said vehicle, handlebars mounted on said frame rotatable from center relative to said frame in opposite directions about an axis and connected to said steerable wheel means for controlling and steering movement of said steerable wheel means, said handlebars being mounted on said frame so that said steerable wheel means is in center with said handlebars in center and rotation of said handlebars in either direction produces movement of said steerable wheel means in the direction corresponding to the rotation of said handlebars; said steering damper including: a container adapted to contain a damping medium therein and having a shaft and also having a vane connected to said shaft forming a vane-shaft unit and a dam, said dam being connected to said container forming a dam-container unit, said vane and said dam defining between them a first compartment and a second compartment in said container, connection adapted to be interposed cooperatively connected between said steering damper and said handlebars for moving said dam-container unit and said vane-shaft unit, one relative to the other, on rotation from center of said handlebars, thereby to reduce the volume of one of said compartments and to expand the volume of said other of said compartments, means included in said steering damper to restrict communication of damping medium between compartments during the aforesaid movement from center of said handlebars thereby to damp the movement of said handlebars, said connection also being adapted to be cooperatively connected between said steering damper and said handlebars also for moving said container and dam-container unit and said vane-shaft unit, one relative to the other, on return rotation of said handlebars to center thereby to expand the volume of said one of said compartments and reduce the volume of said other of said compartments, and means cooperative with said shaft to effect substantial communication of damping medium between said compartments thereby suppressing the damping on said return rotation of said handlebars to near center.

20. A steering damper for a vehicle, said vehicle having handlebars rotatable from a center position for controlling, and undesirably controlled by, the movement of said vehicle; said steering damper including a closed housing adapted to have a damping medium therein, a reservoir, a vane, a dam, a shaft within said housing, said shaft having an axial opening extending from one end thereof and a transverse opening in communication with said axial opening, connection of said vane and shaft forming a unit defined herein as a first unit, connection of said dam and housing also forming a unit defined herein as a second unit, said first unit and said second unit defining between them a first compartment and a second compartment, means adapted to connect cooperatively said steering damper to said handlebars with one of said units rotatable relative to the other in synchronism with rotation of said handlebars, displacement of the handlebars from center in one direction increasing the pressure of the medium in said first compartment, and displacement of the handlebars from center in the opposite direction increasing the pressure of the medium in said second compartment thereby damping the displacement in corresponding opposite directions of the handlebars connected as aforesaid, a substantially restricted path for conducting the medium from the one compartment in which the pressure is increasing to the other compartment, a channel including said axial opening in said shaft and said transverse opening in said shaft for conducting the medium from said reservoir into said other compartment while the pressure in said one compartment is increased, to maintain the pressure in said second compartment, and a second substantially unrestricted channel including said transverse opening in said shaft for conducting the medium from said second compartment to said first compartment on the return of said handlebars to center thereby to suppress the damping of said handlebars.

21. The steering damper of claim 20 wherein the vane includes passages for flow of the medium interposed between the transverse opening in the shaft and the first and second compartments, said passages having a first one-way valve for controlling the flow of the medium between said transverse opening in said shaft and said first compartment and a second one-way valve for controlling the flow of said medium between said transverse opening in said shaft and said second compartment, each said valve being held closed when the pressure of the medium in its corresponding compartment is increased on the displacement in the corresponding direction of the handlebars and being opened on the relaxation of said pressure on the return from displacement of said handlebars, each said valve and the transverse opening in the shaft being connected to the reservoir for conducting medium to the second compartment to supplement the medium contained therein when the medium in the first compartment is under pressure.

22. A steering damper in combination with a vehicle, said vehicle including means for steering said vehicle, said steering damper including a housing adapted to contain a damping medium and having second compartments bounded by respective opposite surfaces of said housing and shaft and opposite surfaces of said vane and said dam, said shaft having a transverse opening and said vane having passages connected to said opening for conducting medium between said vane and said compartments; the said steering damper being characterized by means connected to said passages for conducting medium between said reservoir and said compartments and also including means cooperatively connected to said steering means for controlling the operation of said steering means.

23. The steering damper of claim 22 wherein the means for conducting medium between the reservoir and the compartments includes an axial opening extending from the end of the shaft in communication with the reservoir and the passages.

24. The steering damper of claim 22 wherein the vane includes valves for controlling the flow of medium between the respective compartments and the corresponding passages.

25. A steering damper in combination with a vehicle, said vehicle including steering means, said steering damper including a housing adapted to contain a damping medium and having therein a vane, a dam, a reservoir, and a shaft, first and second compartments being defined by said housing, said shaft and opposite surfaces of said vane and dam, said shaft having openings therein, connected to said reservoir for conducting medium selectively to said first or second compartments and also including means cooperatively connected to said steering means for controlling the operation of said steering means.

26. A steering damper for a vehicle, said vehicle having handlebars, said handlebars being rotatable from center in either direction controlling, and undesirably controlled by, the movement of said bicycle; said steering damper including an annular housing having a dam therein, said housing and dam forming a first unit, a second unit including a ring from whose periphery a vane extends radially and a collar, said ring being mounted within said housing substantially coaxial with said housing, said collar being mounted substantially coaxial within said ring and having flanges defining a circumferential groove, said collar and ring being abutted so that said ring and groove form an annular channel generally coaxial with said housing, a passage through said vane connecting said vane to said channel, said ring and vane and said dam and said housing defining between them a first arcuate compartment and a second arcuate compartment both generally coaxial with said housing, said vane having an opening in its periphery connecting either of said compartments to said channel in dependence upon the angular position of said compartments, said compartments, said channel and said vane being adapted to contain a damping medium, the effective cross-section of said channel permitting substantially unrestricted flow of medium through said channel, said vane having a passage and having one-way valves interposed between each of said compartments and said passage in said vane, said steering damper being adapted to be connected to said handlebars so that displacement of said handlebars from center in either direction rotates one of said units relative to the other and holding closed a corresponding of said valves exerting pressure on the medium in the corresponding compartment damping said displacement and return of said handlebars from said displacement in said one direction opening said valve connecting said corresponding compartment to said channel so that said medium circulates through said channel, said vane, said valve and said one compartment suppressing the damping.

27. A steering damper for a vehicle, said vehicle having handlebars rotatable in either direction from center for controlling, and undesirably controlled by, the movement of said bicycle; said steering damper including an annular housing, a dam within said housing connected to the inner periphery of said housing and forming with said housing a housing assembly, a vane assembly including annular channel means generally coaxial with said housing and a vane extending generally radially from the external periphery of said channel means and having a passage connected to said channel means, said dam, channel means, and vane defining a first compartment and a second compartment, said steering damper being adapted to be mounted in said vehicle connected cooperatively to said handlebars with one of said assemblies movable relative to the other on rotation of said handlebars from center, whereby in dependence of the direction of displacement from center of said handlebars, the volume of one of said compartments is contracted and the volume of the other of said compartments is expanded, an opening in said channel means, said opening being closed by said dam with the handlebars at center, and on displacement of said handlebars from center, opening and interconnecting said channel means and said vane and one or other of said compartments depending on the direction of said displacement from center of said handlebars, said compartments and said channel means and said vane being adapted to contain a damping medium; one-way valves in said vane, one valve being interposed between said first compartment and said passage in said vane and the other valve being interposed between said second compartment and said passage in said vane, one or the other of said valves, dependent on the direction of displacement from center of the handlebars and resulting contraction of the corresponding compartment and resulting increased pressure on the damping medium in said corresponding compartment, being closed, whereby the said displacement from center is damped, and on the return of said handlebars to center the volume of said corresponding compartment is expanded reducing the pressure on said medium in said corresponding compartment and opening said closed valve affording substantially free flow of damping medium through said opening from said other compartment into said corresponding compartment thereby suppressing the damping on said handlebars.

17

28. The steering damper of claim 27 wherein the dam overlaps the opening with the handlebars at center.

29. A steering damper for a vehicle, said steering damper including a generally cylindrical housing adapted to contain a damping medium, a cap for closing one end of said housing and a closure closing the opposite end of said housing, said housing having therein a dam connected to said cap, a shaft and a vane connected to said shaft, said steering damper being characterized by that said cap is integral with said dam.

30. The steering damper of claim 29 wherein the vehicle is a bicycle having handlebars rotatable from center in either direction for controlling, and undesirably controlled by, the movement of said bicycle, the said steering damper having means adapted to mount said steering damper on said bicycle connected to said handlebars for rotating said housing and dam relative to said vane and shaft in dependence upon the rotation of said handlebars connected as aforesaid, said steering damper being characterized by means extending from the cap adapted to be engaged by means on said bicycle to limit said rotation of said housing and dam.

31. A vehicle having a frame, steerable wheel means mounted on said frame movable in opposite directions from center to steer said vehicle, a steer-tube mounted rotatably on said frame, handlebars mounted on said frame rotatable from center relative to said frame in opposite directions about an axis and connected to said steerable wheel means through said steer-tube for controlling the steering movement of said steerable wheel means, said handlebars, said steer-tube and said steerable wheel means being mounted on said frame so that said steerable wheel means is in center with said handlebars in center and rotation of said handlebars in either direction actuates said steerable wheel means to move in direction correspondingly to the rotation of said handlebars, said handlebars being manually rotatable from center in either direction and also being rotatable from center undesirably as on contact of said steerable wheel means with an obstruction; said vehicle also including a steering damper mounted in said steer-tube and connected thereto, said steering damper having a housing adapted to contain a damping medium and also having within said housing a dam, a vane and a shaft, connected to said vane, said vane and dam dividing said housing into a first compartment defined between said vane and one surface of said dam and a second compartment defined between said vane and the opposite surface of said dam, said shaft having an opening therein, one-way valve means interposed between said opening and said compartment, said opening being adapted to be in medium communications selectively through said valve means with one or the other of said compartments in dependence upon the direction of displacement from center of said handlebars, said shaft being positioned relative to said dam with its opening closed by said dam with the handlebars substantially at center, displacement of the handlebars from center in either direction actuating the unit including the housing and dam and the unit including the vane and shaft to move in one direction, one relative to the other, through the connection to the steer-tube causing pressure to be exerted on the medium in a corresponding one of said compartments responsive to the control of said medium by said valve means thereby damping said displacement of the handlebars and during return of the handlebars to center actuating said units to move, one relative to the other, in the opposite direction to reduce said pressure of said medium in said one of said compartments responsive to the control of said medium by said valve means thereby to suppress said damping; said vehicle being characterized by that the inner surface of the dam and the outer surface bounding said opening in said shaft are matching surfaces and by that with the handlebars substantially at center, the surface of the dam overlies the surface bounding the opening in the shaft and extends at each end beyond the boundary of the opening in said shaft to prevent the suppression of damping when the handlebars depart from center.

32. A steering damper for a vehicle, said vehicle having a frame, steerable wheel means mounted on said frame movable in opposite directions from center to steer said vehicle, a steer-tube mounted rotatably on said frame, handlebars mounted on said frame rotatable from center relative to said frame in opposite directions about an axis and connected to said steerable wheel means through said steer-tube for controlling the steering movement of said steerable wheel means, said handlebars, said steer-tube and said steerable wheel means being mounted on said frame so that said steerable wheel means is in center with said handlebars in center and rotation of the handlebars in either direction actuates said steerable wheel means to move in direction correspondingly to the rotation of said handlebars, said handlebars being manually rotatable from center in either direction and also being rotatable from center undesirably as on contact of said steerable wheel means with an obstruction; said steering damper being adapted to be mounted in said steer-tube and also being adapted to be connected to said handlebars cooperatively rotatable therewith on displacement of the handlebars from center, said steering damper having a housing adapted to contain a damping medium and also having within said housing, a dam connected to said housing, said dam and housing being defined herein as constituting a first unit, a shaft, a vane connected to said shaft, said vane and shaft being defined herein as constituting a second unit, one-way valve means connected to said shaft, said first unit and second unit defining between them a first compartment and a second compartment, said shaft having an opening therein adapted to be in medium communication with either of said compartments depending on the position of said handlebars connected as aforesaid and as controlled by said one-way valve means, said shaft being positioned relative to said dam with said opening closed by said dam with said handlebars substantially at center, displacement of the handlebars from center in either direction being adapted to actuate one of said units to move relative to the other of said units, through the said adapted connection to the handlebars, causing pressure to be exerted responsive to the control of said medium by said valve means in a corresponding one of said compartments thereby damping said displacement of said handlebars and during subsequent return of said handlebars to center being adapted to actuate said units responsive to the control of said medium by said valve means to move one of said units relative to the other of said units to reduce said pressure in said medium in the said one of said compartments thereby to suppress the damping; said steering damper being characterized by that the inner surface of said dam and the outer surface bounding said opening in said shaft are matching surface and by that with the handlebars at center, the surface of said dam is adapted to overlie the surface bounding the opening in said shaft to prevent the suppression of damping when the handlebars depart from center.

33. A steering damper for a vehicle, said vehicle including handlebars for controlling, and controlled by, the direction of movement of said vehicle, said handlebars being at center when said vehicle is moving along a directed path and are displacable from center when said vehicle departs from the directed path, said steering damper including a first unit having a housing, adapted to contain a damping medium, and a dam, said steering damper also including a second unit having a vane and a shaft, said shaft having an opening therethrough connected to said vane to conduct damping medium through said vane, means, connected to said units, for interconnecting said units with the outer surface of said shaft and the inner surface of said dam matching surfaces, and connections adapted to be interposed cooperatively between said handlebars and said steering damper for moving the first unit and the second unit, one relative to the other, on displacement of said handlebars from center, the said steering damper being characterized by that the inner surface of said dam extends over and beyond the outer surface of the opening in said shaft when the vehicle is operated with the handlebars substantially at center.

* * * * *